US012558684B2

(12) United States Patent
Ting et al.

(10) Patent No.: US 12,558,684 B2
(45) Date of Patent: Feb. 24, 2026

(54) ELECTRONIC DEVICE

(71) Applicant: Innolux Corporation, Miaoli County (TW)

(72) Inventors: Chin-Lung Ting, Miaoli County (TW); Te-Yu Lee, Miaoli County (TW); Yu-Tsung Liu, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 624 days.

(21) Appl. No.: 17/993,901

(22) Filed: Nov. 24, 2022

(65) Prior Publication Data

US 2023/0204025 A1 Jun. 29, 2023

(30) Foreign Application Priority Data

Dec. 29, 2021 (CN) ......................... 202111634465.9

(51) Int. Cl.
*B81B 3/00* (2006.01)
*B01L 3/00* (2006.01)
*F04B 43/04* (2006.01)
*F04B 53/10* (2006.01)

(52) U.S. Cl.
CPC ......... *B01L 3/5027* (2013.01); *B01L 3/50273* (2013.01); *F04B 43/046* (2013.01); *F04B 53/1072* (2013.01); *B01L 2400/0424* (2013.01)

(58) Field of Classification Search
None
See application file for complete search history.

(56) References Cited

U.S. PATENT DOCUMENTS

2002/0003001 A1* 1/2002 Weigl .................... B01L 3/5027 137/806
2006/0194331 A1* 8/2006 Pamula ................. B81B 3/0021 422/400
2009/0129952 A1* 5/2009 Patrascu ............... F04B 43/046 417/322
2016/0084796 A1* 3/2016 Gasperino ......... B01L 3/502784 204/627
2019/0128248 A1* 5/2019 Govyadinov ......... F04B 19/006
2019/0273177 A1* 9/2019 Hopkin ................... H01L 24/95

FOREIGN PATENT DOCUMENTS

CN 105201796 12/2015
CN 108953123 12/2018
CN 109765179 5/2019
CN 109899272 6/2019
(Continued)

OTHER PUBLICATIONS

CN 105238676 A (Year: 2016).*
(Continued)

*Primary Examiner* — Paul S Hyun
(74) *Attorney, Agent, or Firm* — JCIPRNET

(57) ABSTRACT

An electronic device including a substrate, a thin film transistor, a micro pump, and a micro fluid platform is provided. The thin film transistor is disposed on the substrate. The micro pump is disposed on the substrate and electrically connected to the thin film transistor. The micro fluid platform is disposed on the substrate and coupled to the micro pump. The micro pump is configured to travel a to-be-test sample to the micro fluid platform.

15 Claims, 3 Drawing Sheets

(56) References Cited

FOREIGN PATENT DOCUMENTS

| | | |
|---|---|---|
| CN | 109954526 | 7/2019 |
| JP | 2003094632 | 4/2003 |
| TW | 201928343 | 7/2019 |

OTHER PUBLICATIONS

"Office Action of China Counterpart Application", issued on Apr. 16, 2025, p. 1-p. 8.
"Office Action of China Counterpart Application", issued on Oct. 18, 2025, p. 1-p. 7.

* cited by examiner

ELECTRONIC DEVICE

CROSS-REFERENCE TO RELATED APPLICATION

This application claims the priority benefit of China application serial no. 202111634465.9, filed on Dec. 29, 2021. The entirety of the above-mentioned patent application is hereby incorporated by reference herein and made a part of this specification.

BACKGROUND

Technical Field

The disclosure relates to an electronic device.

Description of Related Art

A lab on a chip is a biochip, which may complete experimental processes with one chip, having advantages of high efficiency and high convenience compared to a conventional bioanalytical instrument. At present, the microfluidics technology is adopted for the more common lab on a chip. In this system, a voltage or air pressure is applied, and principles of electroosmosis, electrophoresis, and pressure balance are used, so that a to-be-test sample may flow in a capillary channel in the chip for reaction or separation.

SUMMARY

An electronic device in the disclosure may be implemented in a compact size.

According to an embodiment of the disclosure, an electronic device includes a substrate, a thin film transistor, a micro pump, and a micro fluid platform. The thin film transistor is disposed on the substrate. The micro pump is disposed on the substrate and electrically connected to the thin film transistor. The micro fluid platform is disposed on the substrate and coupled to the micro pump. The micro pump is configured to travel a to-be-test sample to the micro fluid platform.

In order for the aforementioned features and advantages of the disclosure to be more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
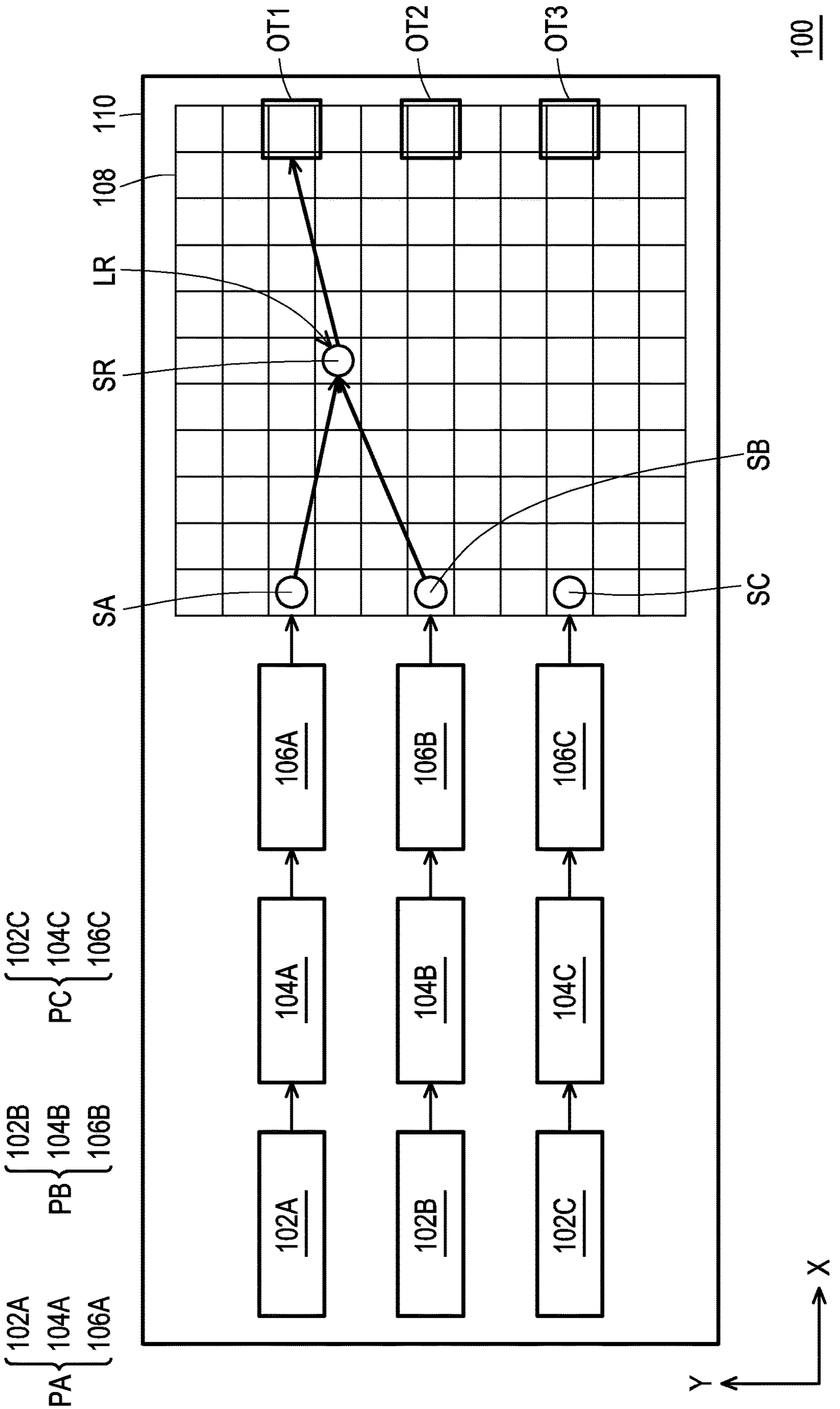
FIG. 1 is a schematic view of an electronic device according to an embodiment of the disclosure.

The disclosure can be understood by referring to the following detailed description in combination with the accompanying drawings. It should be noted that in order to make it easy for the reader to understand and for the simplicity of the drawings, the multiple drawings in this disclosure only depict a part of an electronic device, and the specific components in the drawings are not drawn according to actual scale. In addition, the number and size of each component in the drawings are only for exemplary purpose, and are not intended to limit the scope of the disclosure.

Throughout the disclosure and the appended claims, certain terms are used to refer to specific components. Those skilled in the art should understand that electronic device manufacturers may refer to the same components by different names. The disclosure does not intend to distinguish those components with the same function but different names.

In the following description and claims, the terms “contain” and “include” are open-ended terms, so they should be interpreted as “include but not limited to . . . ”.

It should be understood that when a component or film layer is referred to as being “disposed on” or “connected to” another component or film layer, it may be directly on or directly connected to the another component or film layer. Or, there may be an intervening component or film layer therebetween (in a case of indirect contact). In contrast, when a component is referred to as being “directly on” or “directly connected to” another component or film layer, no intervening component or film layer exists therebetween. In addition, when a component or film layer is referred to as being “electrically connected” to another component or film layer, it may be interpreted as either a direct electrical connection or an indirect electrical connection.

The terms “about”, “essentially”, or “substantially” are generally construed as within plus or minus 10% of a given value, or as within plus or minus 5%, plus or minus 3%, plus or minus 2%, plus or minus 1%, or plus or minus 0.5% of the given value.

Although the terms “first”, “second”, “third”, and the like may be used to describe various constituent components, the constituent components are not limited to the terms. The terms are only used to distinguish a single constituent component from other constituent components in the specification. The same terms may not be used in the claims, and may be replaced with first, second, third, and the like in the order in which the components are declared in the claims. Therefore, in the following description, a first constituent component may be a second constituent component in the claims.

In addition, the term “electrically connected” may include any direct or indirect electrical connection means. For example, “direct electrical connection” may mean that two components are in direct contact and electrically connected, or two elements may be connected in series through one or more conductive components. “Indirect electrical connection” may mean that two elements are separated from each other, and there is no other conductive component between the two components to connect the two together in series. For example, switches, diodes, capacitors, inductors, resistors, other suitable components, or a combination of the aforementioned components may be provided between endpoints of the components on two circuits. However, the disclosure is not limited thereto.

In the disclosure, the thickness, length, and width may be measured using an optical microscope, and the thickness or the width may be measured from a cross-sectional image in an electron microscope, but the disclosure is not limited thereto. In addition, there may be a certain error in any two values or directions for comparison. In addition, the phrases "a given range is from a first numerical value to a second numerical value" and "the given range falls within the range of a first numerical value to a second numerical value" mean that the given range contains the first numerical value, the second numerical value, and other values in between. If a first direction is perpendicular to a second direction, an angle between the first direction and the second direction may be between 80 degrees and 100 degrees. If the first direction is parallel to the second direction, the angle between the first direction and the second direction may be between 0 degrees and 10 degrees.

Unless otherwise defined, all terms (including technical and scientific terms) used herein have the same meaning as commonly understood by those skilled in the art to which the disclosure belongs. It should be understood that, these terms, such as those defined in commonly used dictionaries, should be interpreted as having meaning consistent with the relevant technique and the background or context of the disclosure, and should not be interpreted in an idealized or excessively formal way, unless specifically defined in an embodiment of the disclosure.

In the disclosure, the electronic device may include a display device, a sensing device, or a tiling device, but the disclosure is not limited thereto. The electronic device may be a bendable or flexible electronic device. The display device may be a non-self-luminous display device or a self-luminous display device. The sensing device may be a sensing device for sensing capacitance, light, heat, or ultrasonic waves, but the disclosure is not limited thereto. In the disclosure, an electronic component may include a passive element and an active element, such as a capacitor, a resistor, an inductor, a diode, and a transistor. The diode may include a light emitting diode or a photodiode. The light emitting diode may include, for example, an organic light emitting diode (OLED), a mini LED, a micro LED, or a quantum dot LED, but the disclosure is not limited thereto. It should be noted that the electronic device may be any combination of the above, but the disclosure is not limited thereto.

It should be noted that the technical solutions provided by the different embodiments below may be used interchangeably, combined, or mixed to form another embodiment without violating the spirit of the disclosure.

FIG. 1 is a schematic view of an electronic device according to an embodiment of the disclosure. An electronic device 100 is, for example, a lab on a chip, and FIG. 1 schematically shows individual functional areas in the electronic device 100 in blocks for illustration. Specific structures of the individual functional areas will be described in the subsequent embodiments. In FIG. 1, relative positions of each of the blocks and arrows in FIG. 1 are configured to understand a possible operation sequence of the individual functional areas in experimental processes, rather than to limit a layout configuration of the individual functional areas in space. Therefore, a specific structure of the electronic device 100 is not limited to the schematic view in FIG. 1. In addition, in FIG. 1 and other drawings of the disclosure (e.g., FIG. 2 and FIG. 3), an orientation of each of the devices and components thereof may refer to an X axis, a Y axis, and a Z axis, but the disclosure is not limited thereto.

The electronic device 100 may be configured to process a sample in a fluid state, and for example, may process a sample in a liquid state. The electronic device 100 may have inlet areas 102A, 102B, and 102C, pump areas 104A, 104B, and 104C, channel areas 106A, 106B, and 106C, a platform area 108, and outlet areas OT1, OT2, and OT3. In this embodiment, the inlet area 102A, the pump area 104A, and the channel area 106A are in fluid communication in sequence to establish a first travelling path PA connected to the platform area 108; the inlet area 102B, the pump area 104B, and the channel area 106B are in fluid communication in sequence to establish a second travelling path PB connected to platform area 108, and the inlet area 102C, the pump area 104C, and the channel area 106C are in fluid communication in sequence to establish a third travelling path PC connected to the platform area 108. In addition, the outlet areas OT1, OT2, and OT3 may communicate with the platform area 108. Therefore, the electronic device 100 in FIG. 1 provides three travelling paths connected to the platform area 108, and the three travelling paths are independent of one another. However, the disclosure is not limited thereto. In other embodiments, the number of travelling paths may be adjusted according to actual requirements.

In some embodiments, the inlet areas 102A, 102B, and 102C may be embodied as structures such as openings and voids that may communicate with the outside, and a to-be-test sample may be injected or dripped from the outside into the electronic device 100 through the inlet areas 102A, 102B, and 102C. The pump areas 104A, 104B, and 104C may be adjacent to the inlet areas 102A, 102B, and 102C, respectively, and the pump areas 104A, 104B, and 104C may be provided with micro pumps. The micro pumps in the pump areas 104A, 104B, and 104C may achieve a pumping effect to travel the to-be-test sample entering from the inlet areas 102A, 102B, and 102C towards the channel areas 106A, 106B, and 106C. The channel areas 106A, 106B, and 106C may be micro channels, and a channel width and a channel length of the micro channels may be adjusted according to different requirements. In some embodiments, the micro channels may be meandering channels, arcuate channels, linear channels, or the like. A control component for assisting experiments may be disposed in the platform area 108. In some embodiments, the control component in the platform area 108 may control a movement of the to-be-test sample, so that the to-be-test sample is moved to a set position, so as to perform a required reaction in the platform area 108. In addition, the control component in the platform area 108 may further drive the reacted sample and the remaining sample to move to the outlet areas OT1, OT2, and OT3. The outlet areas OT1, OT2, and OT3 may be embodied as structures such as openings and voids that may communicate with the outside, and the reacted sample and the remaining sample may leave the electronic device 100 from the outlet areas OT1, OT2, and OT3. In some embodiments, the reacted sample may be taken out from one of the outlet areas OT1, OT2, and OT3 and subjected to further experiments, while the remaining sample may be taken out from another of the outlet areas OT1, OT2, and OT3 or flow into a storage tank (a container).

In some embodiments, a first to-be-test sample SA may be injected into the electronic device 100 from the inlet area 102A, and is transported toward the channel area 106A and flows through the channel area 106A to enter the platform area 108 under the pumping of the micro pump disposed in the pump area 104A. That is, the first to-be-test sample SA may be transported to the platform area 108 through the first travelling path PA. Similarly, a second to-be-test sample SB may be injected into the electronic device 100 from the inlet area 102B and transported to the platform area 108 through the second travelling path PB established by the inlet area 102B, the pump area 104B, and the channel area 106B. A third to-be-test sample SC may be injected into the electronic device 100 from the inlet area 102C and transported to the platform area 108 through the third travelling path PC established by the inlet area 102C, the pump area 104C, and the channel area 106C.

The first to-be-test sample SA, the second to-be-test sample SB, and the third to-be-test sample SC may be moved to a preset position in the platform area 108 under driving control of the control component disposed in the platform area 108. For example, FIG. 1 schematically shows that the first to-be-test sample SA and the second to-be-test sample SB are controlled to move to a set position LR and in contact with each other at the set position LR. In some embodiments, one of the first to-be-test sample SA and the second to-be-test sample SB may be a biological cell, and the other may be a reagent expected to react with the biological cell. Through a control operation shown in FIG. 1, the to-be-test cell may react with the to-be-test reagent at the set position LR. A to-be-test sample SR after the first to-be-test sample SA reacts with the second to-be-test sample SB may be controlled by the control component disposed in the platform area 108 to move toward the outlet area OT1, and may be taken out from the outlet area OT1 to leave the electronic device 100. After the reacted to-be-test sample SR is taken out, the remaining sample that does not participate in the reaction may be taken out from at least one of the outlet areas OT1, OT2, and OT3 and collected in a storage container or a similar storage structure. A method of taking out the sample may include pipetting with a micropipette, but the disclosure is not limited thereto.

Here, during the movement and reaction of the to-be-test sample in the electronic device 100, a suitable instrument or imaging device may be used, such as an optical microscope, a fluorescence spectrometer, a Fourier-transform infrared spectroscopy (FTIR), and a Raman spectrometer, for observation. For example, the imaging device may be configured to observe the reaction of the first to-be-test sample SA and the second to-be-test sample SB at the set position LR, and then drive the control component disposed in the platform area 108 to move the reacted to-be-test sample SR to the outlet area OT1 after the observation of the reaction is completed.

In this embodiment, the electronic device 100 includes a substrate 110, and the first travelling path PA, the second travelling path PB, the third travelling path PC, and the platform area 108 are all integrated in the substrate 110. That is, the components for implementing the inlet areas 102A, 102B, and 102C, the pump areas 104A, 104B, and 104C, the channel areas 106A, 106B, and 106C, and the platform area 108 are all manufactured on the substrate 110. Here, a size of the substrate 110 is about 1 inch to 3 inches, so the electronic device 100 may be a chip-level device. In other words, the electronic device 100 implements experimental steps originally performed in a laboratory in a compact size, or reduces the experimental steps through the electronic device 100 to increase convenience of operation.

Figure 2:
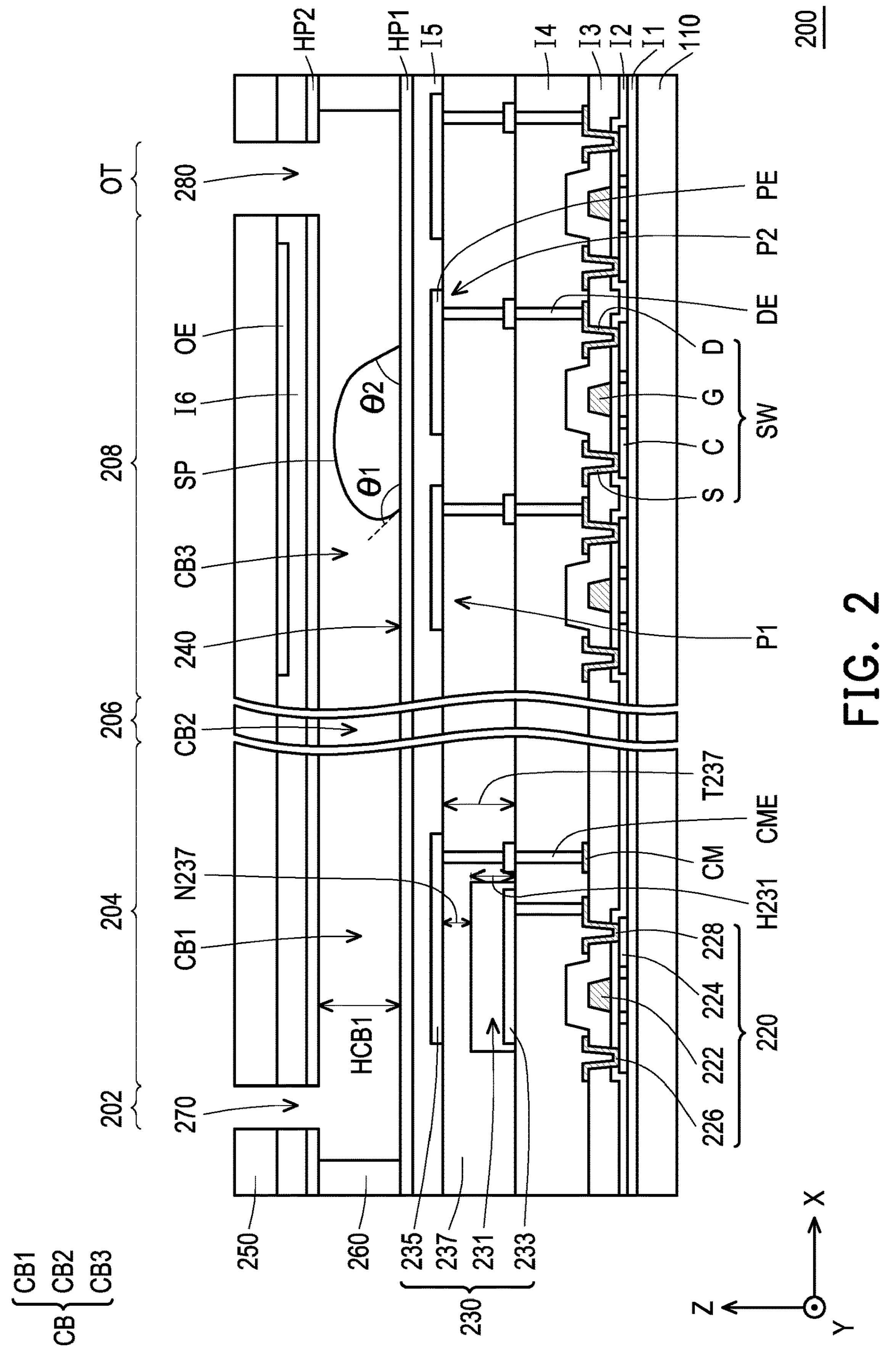
FIG. 2 is a schematic partial cross-sectional view of an electronic device according to an embodiment of the disclosure.

FIG. 2 is a schematic partial cross-sectional view of an electronic device according to an embodiment of the disclosure. An electronic device 200 in FIG. 2 has an inlet area 202, a pump area 204, a channel area 206, a platform area 208, and an outlet area OT. Functions provided by the areas are substantially the same as functions of the inlet areas 102A, 102B, and 102C, the pump areas 104A, 104B, and 104C, the channel areas 106A, 106B, and 106C, the platform area 108, and the outlet areas OT1, OT2, and OT3 in FIG. 1. Therefore, the electronic device 200 may serve as one of the embodiments of the electronic device 100 in FIG. 1. In this embodiment, the electronic device 200 includes the substrate 110, a thin film transistor 220, a micro pump 230, and a micro fluid platform 240. The thin film transistor 220 is disposed on the substrate 110. The micro pump 230 is disposed on the substrate 110 and electrically connected to the thin film transistor 220. The micro fluid platform 240 is disposed on the substrate 110 and coupled to the micro pump 230. The micro pump 230 is configured to travel the to-be-test sample (SA, SB, or SC as shown in FIG. 1) to the micro fluid platform 240. In the disclosure, the term, coupling, may be understood as connection, and may include direct connection or indirect connection, and even electrical connection. Here, the micro pump 230 is located in the pump area 204; the micro fluid platform 240 is located in the platform area 208, and the channel area 206 extends in an area between the micro pump 230 and the micro fluid platform 240. As shown in FIG. 2, the pump area 204, the channel area 206, and the platform area 208 are disposed in sequence with one another.

For example, the electronic device 200 further includes an opposite substrate 250 and a spacing member 260. The substrate 110 is disposed opposite to the opposite substrate 250, and the spacing member 260 is disposed between the substrate 110 and the opposite substrate 250, so as to form a micro fluid chamber CB between the substrate 110 and the opposite substrate 250. The micro fluid chamber CB may be continuously distributed in the pump area 204, the channel area 206, and the platform area 208, so that the pump area 204, the channel area 206, and the platform area 208 are in fluid communication. For convenience of description, hereinafter, the micro fluid chamber CB is divided into a travelling chamber CB1 in the pump area 204, a micro fluid channel CB2 in the channel area 206, and an experimental chamber CB3 in the platform area 208. The travelling chamber CB1, the micro fluid channel CB2, and the experimental chamber CB3 are in fluid communication with one another, and may have different sizes according to different design requirements. In other words, the micro fluid channel CB2 may be coupled between the micro fluid platform 240 and the micro pump 230. For example, although not shown in the figure, the spacing member 260 disposed between the substrate 110 and the opposite substrate 250 may be patterned to enclose the sizes and shapes of the travelling chamber CB1, the micro fluid channel CB2, and the experimental chamber CB3. For example, the micro fluid channel CB2 in the channel area 206 may have a meandering extending path by using a structure of the spacing member 260. The experimental chamber CB3 in the platform area 208 may use the structure of the spacing member 260 to enclose a relatively large area to provide a required platform. In addition, when applied to a layout design in FIG. 1, the spacing member 260 may extend between the adjacent travelling paths, so that each of the travelling path remains independent.

In this embodiment, an inlet 270 and an outlet 280 may be disposed on the opposite substrate 250. A location of the inlet 270 may be the inlet area 202, and a location of the outlet 280 may be the outlet area OT. The inlet 270 may be disposed adjacent to the micro pump 230, and the outlet 280 may be disposed adjacent to the micro fluid platform 240. The inlet 270 and the outlet 280 may pass through the opposite substrate 250 to provide the micro fluid chamber CB for communication and/or coupling with the outside. An operation method of the electronic device 200 may include that the to-be-test sample is injected into the micro fluid chamber CB from the inlet 270, and the micro pump 230 is activated to drive the to-be-test sample in the travelling chamber CB1, thereby travelling the to-be-test sample to the micro fluid platform 240. In some embodiments, the to-be-test sample may react on the micro fluid platform 240 and be taken out from the outlet 280 after the reaction. Therefore, the electronic device 200 may implement experimental operations that originally required human beings. In some embodiments, the to-be-test sample may include particles such as cells, inorganic ions, organic substances, proteins, and nucleic acids, and carriers that carry the particles. In some embodiments, the carrier may include liquid substances such as ionic fluids, organic solvents, and physiological fluids (e.g., blood or sweat).

The thin film transistor 220 may include a gate 222, a channel layer 224, a source 226, and a drain 228. The gate 222 and the channel layer 224 are disposed opposite to and spaced apart from each other. The source 226 and the drain 228 are in contact with different areas of the channel layer 224. When the gate 222 of the thin film transistor 220 receives a turn-on signal, the channel layer 224 may electrically communicate the source 226 with the drain 228 to transmit the signal received by the source 226 to the drain 228.

The micro pump 230 may include a cavity 231, a first electrode 233, and a second electrode 235. The cavity 231 is disposed between the first electrode 233 and the second electrode 235. In this embodiment, the micro pump 230 further includes a membrane 237, and the membrane 237 is disposed between the cavity 231 and the second electrode 235. For example, the membrane 237 may be configured to define the cavity 231. The thin film transistor 220 is electrically connected to the first electrode 233. The thin film transistor 220 is configured to provide the first electrode 233 with a different voltage compared to the second electrode 235, so that the cavity 231 is squeezed or expanded, and pressure of the micro fluid chamber CB is changed to travel the to-be-test sample to the micro fluid platform 240. That is, the micro pump 230 may be driven by the thin film transistor 220 to perform a pump operation, and the pump operation of the micro pump 230 may travel the to-be-test sample (which may include the to-be-analyze particles and the carriers) in the travelling chamber CB1. In some embodiments, an electrode line CM may be disposed on the substrate 110, and the second electrode 235 is connected to the electrode line CM. The electrode line CM is configured to provide the voltage to the second electrode 235, and the voltage provided by the electrode line CM to the second electrode 235 may be different from the voltage provided by the thin film transistor 220 to the first electrode 233.

The thin film transistor 220 may be manufactured by manufacturing processes such as thin film deposition, photolithography and etching. For example, before the channel layer 224 is manufactured on the substrate 110, an insulation layer I1 may be selectively formed, and the channel layer 224 is formed on the insulation layer I1. Next, an insulation layer I2 is formed on the channel layer 224, and the gate 222 is formed on the insulation layer I2. Afterwards, an insulation layer I3 is formed on the gate 222, and the source 226, the drain 228, and the electrode line CM are formed on the insulation layer I3. The insulation layer I3 may have a contact opening to allow the source 226 and the drain 228 to be in contact with the channel layer 224 through the opening. In this way, the thin film transistor 220 may be completed.

In some embodiments, a material of the channel layer 224 includes a semiconductor material, such as an organic semiconductor and an inorganic semiconductor. In some embodiments, the material of the channel layer 224 includes a silicon semiconductor, such as crystalline silicon, polycrystalline silicon, microcrystalline silicon, and amorphous silicon. In some embodiments, materials of the gate 224, the source 226, and the drain 228 include metal materials, such as aluminum, molybdenum, copper, silver, alloys of the metal materials, or stack layers of the metal materials. The insulation layer I1 to the insulation layer I3 may include organic insulation materials, inorganic insulation materials, or stack layers of the insulation materials. The inorganic insulation materials include silicon oxide, silicon nitride, silicon oxynitride, other oxide insulation materials, other nitride insulation materials, or other oxynitride insulation materials. The organic insulation materials include planarization layer materials, resin materials, or other similar materials. In some embodiments, the insulation layer I1 to the insulation layer I3 may be transparent film layers. Therefore, the insulation layer I1 to the insulation layer I3 may allow light, such as visible light, to pass through.

An insulation layer I4 may then be formed on the source 226, the drain 228, and the electrode line CM. A material of the insulation layer I4 may be similar to the materials of the insulation layer I1 to the insulation layer I3. The insulation layer I4 may provide a planarized surface on which the micro pump 230 may be disposed, but the disclosure is not limited thereto. The first electrode 233 is formed on the insulation layer I4. In some embodiments, a connection electrode CME may be formed corresponding to the electrode line CM while the first electrode 233 is formed. The insulation layer I4 may have an opening corresponding to the drain 228 and the electrode line CM, so that the first electrode 233 and the connection electrode CME are respectively in contact with the drain 228 and the electrode line CM through the corresponding opening. Materials of the first electrode 233 and the connection electrode CME may include transparent conductive materials or opaque conductive materials. The transparent conductive materials may include, for example, indium tin oxide, indium zinc oxide, or other suitable transparent conductive materials, but the disclosure is not limited thereto. The opaque conductive materials may include, for example, aluminum, molybdenum, copper, silver, alloys, or other suitable opaque conductive materials, but the disclosure is not limited thereto.

Next, the membrane 237 may be formed on the first electrode 233 and the connection electrode CME, and the cavity 231 may be formed between the membrane 237 and the insulation layer I4 corresponding to the first electrode 233. A manufacturing method of the membrane 237 may include that a sacrificial material is first formed on the insulation layer I4, so that the sacrificial material is located at a place where the cavity 231 is expected to be formed. Next, the membrane 237 is formed on the insulation layer I4, so that the membrane 237 covers the sacrificial material. When the membrane 237 is manufactured, a void that communicates to the sacrificial material may be formed in the membrane 237, and after the membrane 237 is completed, the sacrificial material may be removed by the void of the membrane 237. A method of removing the sacrificial material may include that a corresponding etchant is used to remove the sacrificial material according to properties of the sacrificial material, but the disclosure is not limited thereto. Afterwards, the void of the membrane 237 for removing the sacrificial material may be filled with a filler material or a sealing material to seal the membrane 237. In some embodiments, a material of the membrane 237 may include the organic insulation materials or the inorganic insulation materials. The inorganic insulation materials may include oxide, nitride, or oxynitride based insulation material, while the organic materials may include organic planarization layer materials or similar materials. However, the disclosure is not limited thereto. The membrane 237 has a thickness N237 at the cavity 231. For example, a thickness T237 of the membrane 237 outside the cavity 231 is greater than the thickness N237 at the cavity 231. In some embodiments, a sum of a height H231 of the cavity 231 and the thickness N237 of the membrane 237 at the cavity 231 may be substantially equal to the thickness T237 of the membrane 237 outside the cavity 231, but the disclosure is not limited thereto.

Next, the second electrode 235 is formed on the membrane 237, and the micro pump 230 is completed. The membrane 237 may have an opening therein corresponding to the connection electrode CME, and the second electrode 235 may be connected to the connection electrode CME in the opening. In this way, the second electrode 235 may be connected to the electrode line CM through the connection electrode CME. In this embodiment, the second electrode 235 may be formed by the transparent conductive materials, such as indium tin oxide and indium zinc oxide, but the disclosure is not limited thereto. In addition, an insulation layer I5 formed on the second electrode 235 may be used as a protective layer, and a material of the insulation layer I5 may be similar to the materials of the insulation layer I1 to insulation layer I4.

In the micro pump 230, the first electrode 233 and the second electrode 235 disposed on two opposite sides of the cavity 231 overlap each other in a thickness direction (e.g., a Z axis direction) to form a capacitance structure. That is, an area of the first electrode 233 projected on the substrate 110 in the thickness direction may overlap an area of the second electrode 235 projected on the substrate 110 in the thickness direction, and the first electrode 233 and the second electrode 235 are electrically independent of each other. In this way, by adjusting an input voltage, electrostatic interaction between the first electrode 233 and the second electrode 235 may be changed. For example, if the first electrode 233 and the second electrode 235 have a reverse potential based on the input voltage, the first electrode 233 and the second electrode 235 may be attracted to each other based on the electrostatic interaction. At this time, the cavity 231 disposed between the first electrode 233 and the second electrode 235 may be compressed/contracted to expand/inflate the corresponding travelling chamber CB1. That is, the height H231 of cavity 231 may be reduced, while a height HCB1 of the travelling chamber CB1 may be increased. Conversely, if the first electrode 233 and the second electrode 235 have the same potential based on the input voltage, the first electrode 233 and the second electrode 235 may repel each other based on the electrostatic interaction. At this time, the cavity 231 between the first electrode 233 and the second electrode 235 may be expanded/inflated to squeeze/contract the corresponding travelling chamber CB1. That is, the height H231 of the cavity 231 may be increased, while the height HCB1 of the travelling chamber CB1 may be reduced. In this way, the micro pump 230 may achieve a pump effect by controlling a voltage phase of the first electrode 233 and the second electrode 235. In some embodiments, mechanical properties that a stack layer of the membrane 237 at the cavity 231, the second electrode 235, and the insulation layer I5 may have may withstand the above expansion/inflation of the cavity 231 and deformation caused by the squeezing/contraction.

In this embodiment, the micro fluid platform 240 may be an electrowetting on dielectric (EWOD) platform, but the disclosure is not limited thereto. For example, the electronic device 200 may include multiple switching components SW, multiple switching electrodes PE, a hydrophobic layer HP1, a hydrophobic layer HP2, an insulation layer I6, and an opposite electrode OE in the platform area 208, and the micro fluid platform 240 is implemented with the components. The switching components SW, the switching electrodes PE, and the hydrophobic layer HP1 are disposed on the substrate 110. The switching component SW may specifically have a structure similar to the thin film transistor 220, which includes a gate G, a channel layer C, a source S, and a drain D, and a configuration relationship of the gate G, the channel layer C, the source S, and the drain D is substantially the same as a configuration relationship of the gate 222, the channel layer 224, the source 226, and the drain 228. Therefore, the same details will not be repeated in the following. The switching electrodes PE may be connected to the drain D of the switching component SW, and the switching electrodes PE may be the same film layer as the second electrode 235. In some embodiments, the switching electrodes PE may be connected to the drain D through a connection electrode DE, and the connection electrode DE may be the same film layer as the connection electrode CME. The hydrophobic layer HP1 is disposed on the insulation layer I5, but the disclosure is not limited thereto. The opposite electrode OE, the insulation layer I6, and the hydrophobic layer HP2 are disposed on the opposite substrate 250 and are sequentially arranged from the opposite substrate 250 to the substrate 110. The hydrophobic layer HP1 and the hydrophobic layer HP2 may selectively extend throughout the micro fluid chamber CB, and may be in contact with a fluid in the micro fluid chamber CB.

In some embodiments, materials of the hydrophobic layer HP1 and the hydrophobic layer HP2 may include a fluorine-containing material. Potential levels of the switching electrodes PE and the opposite electrode OE may affect hydrophobic properties of the hydrophobic layer HP1 and the hydrophobic layer HP2. For example, when the voltage is applied to the switching electrodes PE and the opposite electrode OE, one of the switching electrodes PE and the opposite electrode OE at a high potential makes the corresponding hydrophobic layer HP1 less hydrophobic. For example, each of the switching electrodes PE and the corresponding switching component SW are regarded as a switching unit, and two adjacent switching unit P1 and switching unit P2 are taken for illustration. When the switching electrode PE of the switching unit P1 has a lower potential compared to the opposite electrode OE, and the switching electrode PE of the switching unit P2 has a higher potential compared to the opposite electrode OE, hydrophobicity of the hydrophobic layer HP1 at the switching unit P1 is higher than the hydrophobicity at the switching unit P2. At this time, a contact angle $\theta 1$ of a droplet-shaped to-be-test sample SP in the experimental chamber CB3 at the switching unit P1 is greater than a contact angle $\theta 2$ at the switching unit P2. As a result, the to-be-test sample SP may be driven toward the switching unit P2 and/or away from switching unit P1. Through such an operation, the to-be-test sample SP in the experimental chamber CB3 may be driven to move in a set direction in the platform area 208. That is, the micro fluid platform 240 may be used to implement the operations described in FIG. 1 to move the sample to the set position LR. However, a method of moving the sample is not limited thereto.

In general, after the to-be-test sample SP is injected into the micro fluid chamber CB of the electronic device 200 from the inlet 270, the to-be-test sample SP may be driven by the micro pump 230 in the pump area 204 to flow toward the micro fluid channel (i.e., the micro fluid channel CB2) of the channel area 206. Next, after the to-be-test sample SP flows into the platform area 208 from the micro fluid channel, the to-be-test sample SP may be driven by the switching unit (e.g. the switching unit P1 and the switching unit P2) to move to a predetermined position, and as described in the embodiment of FIG. 1, perform a predetermined reaction (e.g., mixing, acting, and/or reacting with another to-be-test sample) at the predetermined position. Therefore, in this embodiment, the experimental steps performed in the laboratory may be reduced to be performed in the chip-level electronic device 200, so as to implement the lab on a chip. In some embodiments, the operation of travelling the to-be-test sample SP by the micro pump 230 in the pump area 204 and the operation of moving the to-be-test sample SP by the switching unit P1 and the switching unit P2 in the platform area 208 may be performed in different periods or at the same time based on different requirements and experimental processes. In addition, the operation of moving the to-be-test sample SP by the switching unit P1 and the switching unit P2 in the platform area 208 may further drive the to-be-test sample SP to move to the outlet 280, and the to-be-test sample SP and other substances (carriers, other particles, etc.) in the micro fluid chamber CB may be taken out from the outlet 280 in a suitable manner. In some embodiments, the to-be-test sample SP or other particles may be drawn from the outlet 280 using the micropipette. In some embodiments, the substance injected into the electronic device 200 may be extracted from the outlet 280 using an additional pump.

Figure 3:
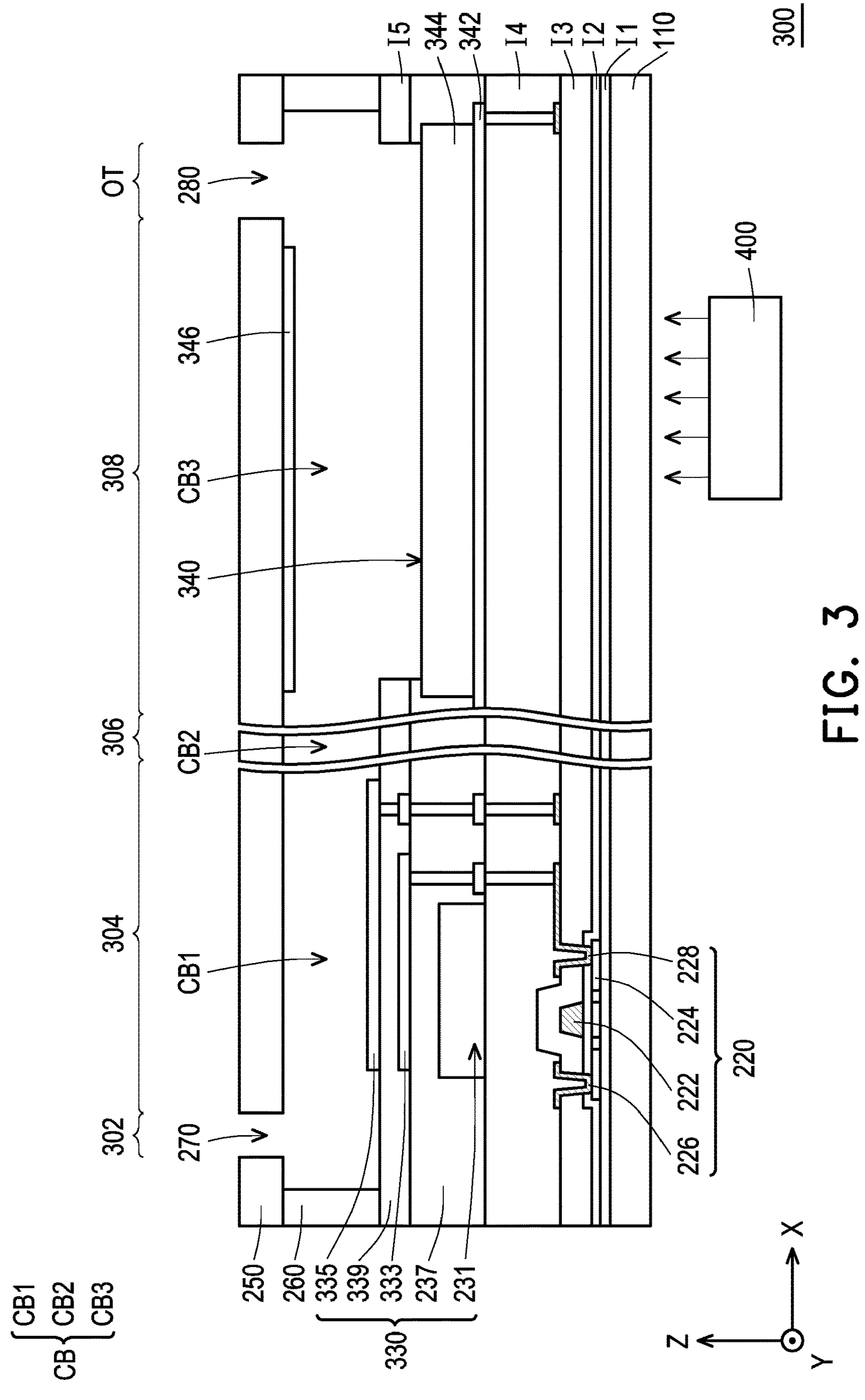
FIG. 3 is a schematic partial cross-sectional view of an electronic device according to an embodiment of the disclosure.

FIG. 3 is a schematic partial cross-sectional view of an electronic device according to an embodiment of the disclosure. An electronic device 300 in FIG. 3 has an inlet area 302, a pump area 304, a channel area 306, a platform area 308, and the outlet area OT. Functions provided by the areas are substantially the same as the functions of the inlet areas 102A, 102B, and 102C, the pump areas 104A, 104B, and 104C, the channel areas 106A, 106B, and 106C, the platform area 108, and the outlet areas OT1, OT2, and OT3 in FIG. 1. Therefore, the electronic device 300 may serve as one of the embodiments of the electronic device 100 in FIG. 1. The electronic device 300 includes the substrate 110, the thin film transistor 220, a micro pump 330, and a micro fluid platform 340. The thin film transistor 220 is disposed on the substrate 110. The micro pump 330 is disposed on the substrate 110 and electrically connected to the thin film transistor 220. The micro fluid platform 340 is disposed on the substrate 110 and coupled to the micro pump 330. In this embodiment, the thin film transistor 220 is similar to the thin film transistor in FIG. 2, so a specific structure of the thin film transistor 220 may refer to the description in FIG. 2. Specifically, the electronic device 300 may further include the opposite substrate 250 and the spacing member 260, and the spacing member 260 separates the substrate 110 from the opposite substrate 250 to space the micro fluid chamber CB between the substrate 110 and the opposite substrate 250. A distribution layout of the micro fluid chamber CB may refer to the description in FIG. 2. Structures of the micro pump 330 and the micro fluid platform 340 in this embodiment are different from structures of the micro pump 230 and the micro fluid platform 240 in FIG. 2, but functions of the micro pump 330 and the micro fluid platform 340 are substantially similar to functions of the micro pump 230 and the micro fluid platform 240. In some embodiments, the micro pump 330 in FIG. 3 may be used with the micro fluid platform 240 in FIG. 2 to implement the electronic device as the lab on a chip, or the micro pump 230 in FIG. 2 is used with the micro fluid platform 340 in FIG. 3 to implement the electronic device as the lab on a chip. Therefore, the embodiments of FIG. 2 and FIG. 3 are merely used to illustrate implementations of the micro pump and the micro fluid platform, but the disclosure is not limited to the combination of the two. Hereinafter, the structures of the micro pump 330 and the micro fluid platform 340 will be described in detail.

The micro pump 330 may include the cavity 231, a first electrode 333, a second electrode 335, the membrane 237, and a piezoelectric layer 339. The cavity 231 may be defined by the membrane 237, and descriptions of the structures and the materials of the cavity 231 and the membrane 237 may refer to the related descriptions in FIG. 2. In this embodiment, the piezoelectric layer 339 is disposed between the first electrode 333 and the second electrode 335, and the first electrode 333 and the second electrode 335 are disposed on a side of the cavity 231. Specifically, the first electrode 333 is located between the substrate 110 and the second electrode 335; the membrane 237 is located between the first electrode 333 and the cavity 231, and the cavity 231 is located between the substrate 110 and the first electrode 333. The piezoelectric layer 339 has a property of being deformable by an electric field, for example. Therefore, when the voltage is applied to the first electrode 333 and the second electrode 335, the piezoelectric layer 339 may be deformed, causing the cavity 231 to be squeezed or expanded to travel the to-be-test sample to the micro fluid platform 340. A material of the piezoelectric layer 339 includes aluminum nitride (AlN), polyvinylidene fluoride (PVDF) and a copolymer thereof, polyvinyl fluoride, lead zirconate titanate (PZT), barium titanate (BaTiO3), zinc oxide (ZnO), etc. In some embodiments, both the first electrode 333 and the second electrode 335 may be transparent electrodes to allow the light to pass through, and the light may be the visible light, for example. The micro pump 330 may be manufactured on the substrate 110 by means of thin film deposition as well as photolithography and etching, thereby facilitating an implementation of the electronic device 300 in a chip-level size. In other words, the electronic device 300 is, for example, a lab on a chip integrated with a pump function.

The micro fluid platform 340 is an optically-induced dielectrophoresis (ODEP) platform. Specifically, the electronic device 300 may include a switching electrode 342, a semiconductor layer 344, and an opposite electrode 346 in the platform area 308. The switching electrode 342 and the semiconductor layer 344 are disposed on the substrate 110, and the opposite electrode 346 is disposed on the opposite substrate 250. The switching electrode 342 is located between the substrate 110 and the semiconductor layer 344. The semiconductor layer 344 and the opposite electrode 346 are respectively located on two opposite sides of the micro fluid chamber CB. The switching electrode 342, the semiconductor layer 344, and the opposite electrode 346 may extend substantially in the platform area 308 without being patterned into individual pixels, but the disclosure is not limited thereto. In some embodiments, the semiconductor layer 344 may include the semiconductor materials such as amorphous silicon, crystalline silicon, and polycrystalline silicon. Materials of the switching electrode 342 and the opposite electrode 346 may include the transparent conductive materials, so as to allow the light to pass through. The light may be the visible light, for example.

The optically-induced dielectrophoresis technology is to generate a uniform electric field by applying an alternating current to the switching electrode 342 and the opposite electrode 346 to polarize the particles (such as the to-be-test sample) in the micro fluid chamber CB, and then use an external optical pattern to induce the semiconductor layer 344 to form a virtual electrode, thereby generating a non-uniform electric field to manipulate the particles or the cells.

The so-called "virtual electrode" may be understood as, when the external optical pattern is irradiated to the semiconductor layer 344, impedance of an irradiated area is lower than impedance of an unirradiated area, so a signal of the opposite electrode 346 may be transmitted, generating an effect like an "actual electrode". Therefore, the electronic device 300 may be used with an external light source 400 to achieve an optically-induced dielectrophoresis effect, and the external light source 400 may emit the light toward the semiconductor layer 344 from a side of the substrate 110. In some embodiments, the external light source 400 may have a patterned baffle, so that the light irradiated on the semiconductor layer 344 has a predetermined pattern distribution to implement the virtual electrode. Generally, generation of an optically-induced dielectrophoresis force requires a solution of low conductivity and a suitable dielectric constant. Therefore, liquids with the low conductivity and the suitable dielectric constant may be used as the carriers for fluids to be placed in the electronic device. When the to-be-test sample is a cell, magnitude of the optically-induced dielectrophoresis force on the cell depends on a size of the cell, dielectric properties of the cell and the surrounding solution, a gradient of the electric field, and a frequency of the electric field. Therefore, electrical signals of the switching electrode 342 and the opposite electrode 346 may be adjusted according to the to-be-test sample to achieve the desired optically-induced dielectrophoresis effect. In addition, in this embodiment, the piezoelectric layer 339 may not extend to the platform area 308 to reduce shielding of the electric field generated by the semiconductor layer 344.

Based on the above, the electronic device according to the embodiment of the disclosure integrates the micro pump into the lab on a chip, and may implement the multiple steps in the laboratory in the compact size.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. An electronic device, having an inlet area, a pump area, a channel area, a platform area, and an outlet area, wherein the inlet area, the pump area, and the channel area are in fluid communication in sequence to establish a travelling path connected to the platform area and the electronic device comprises:

a substrate;

a thin film transistor disposed on the substrate;

a micro pump disposed on the substrate in the pump area and electrically connected to the thin film transistor;

a micro fluid platform disposed on the substrate in the platform area and coupled to the micro pump, wherein the channel area extends between the micro pump and the micro fluid platform;

a micro fluid chamber continuously distributed in the pump area, the channel area, and the platform area; and a hydrophobic layer extending throughout the micro fluid chamber;

wherein the micro pump is configured to travel a to-be-test sample in the micro fluid chamber to the micro fluid platform.

2. The electronic device according to claim 1, wherein the micro pump comprises a cavity, a first electrode, and a second electrode, and the thin film transistor is electrically connected to the first electrode, wherein the thin film transistor is configured to provide the first electrode with different voltages relative to the second electrode, so that the cavity is squeezed or expanded to travel the to-be-test sample to the micro fluid platform.

3. The electronic device according to claim 2, wherein the cavity is disposed between the first electrode and the second electrode.

4. The electronic device according to claim 2, further comprising a membrane disposed between the cavity and the second electrode.

5. The electronic device according to claim 2, further comprising a piezoelectric layer disposed between the first electrode and the second electrode, wherein the first electrode and the second electrode are disposed on a side of the cavity.

6. The electronic device according to claim 2, further comprising a membrane disposed between the cavity and the first electrode.

7. The electronic device according to claim 1, wherein the micro fluid chamber comprises a microfluid channel coupled between the micro fluid platform and the micro pump.

8. The electronic device according to claim 1, wherein the micro fluid platform is an electrowetting dielectric platform.

9. The electronic device according to claim 1, wherein the micro fluid platform is an optically-induced dielectrophoresis platform.

10. The electronic device according to claim 1, further comprising an opposite substrate and a spacing member, wherein the spacing member is disposed between the substrate and the opposite substrate.

11. The electronic device according to claim 10, wherein the spacing member forms the micro fluid chamber between the substrate and the opposite substrate.

12. The electronic device according to claim 10, wherein an inlet and an outlet are disposed on the opposite substrate, the inlet is disposed adjacent to the micro pump, and the outlet is disposed adjacent to the micro fluid platform.

13. The electronic device according to claim 1, further comprising an insulation layer, wherein the insulation layer is disposed on the substrate, and the hydrophobic layer is disposed on the insulation layer.

14. The electronic device according to claim 13, further comprising a switching component and a switching electrode disposed on the substrate, wherein the switching electrode is connected to the switching component, and the insulation layer is located between the hydrophobic layer and the switching electrode.

15. The electronic device according to claim 1, wherein the micro fluid chamber comprises a travelling chamber in the pump area, and the micro pump is configured to change a height of the travelling chamber.

* * * * *